(12) United States Patent
Biswal et al.

(10) Patent No.: US 9,026,256 B2
(45) Date of Patent: May 5, 2015

(54) SYSTEM AND METHOD FOR REAL-TIME FEEDER RECONFIGURATION FOR LOAD BALANCING IN DISTRIBUTION SYSTEM AUTOMATION

(75) Inventors: Abhinna Chandra Biswal, Pallahara (IN); Ashish Mangla, Bangalore (IN); Rajeev Jha, Bangalore (IN); Akilur Rahman, Puri (IN)

(73) Assignee: ABB Technology AG, Zürich (CH)

( * ) Notice: Subject to any disclaimer, the term of this patent is extended or adjusted under 35 U.S.C. 154(b) by 845 days.

(21) Appl. No.: 13/227,936

(22) Filed: Sep. 8, 2011

(65) Prior Publication Data

US 2012/0065804 A1 Mar. 15, 2012

Related U.S. Application Data

(63) Continuation of application No. PCT/IB2009/007845, filed on Dec. 22, 2009.

(30) Foreign Application Priority Data

Mar. 9, 2009 (IN) .............................. 529/CHE/2009

(51) Int. Cl.
G05B 15/00 (2006.01)
G08B 21/00 (2006.01)
H02J 3/48 (2006.01)

(52) U.S. Cl.
CPC ........................ *H02J 3/48* (2013.01)

(58) Field of Classification Search
CPC .......... H02M 3/07; H02M 2001/0009; H02M 3/1584; H02M 1/34; H02M 3/00; H02M 3/157; B23Q 11/0021; B23Q 11/0028; B23Q 1/5437; G01B 11/08; G01B 7/12; G05B 13/02; G05B 2219/40261; G06F 13/42
USPC ................................... 700/286; 340/635, 646
See application file for complete search history.

(56) References Cited

U.S. PATENT DOCUMENTS 4,624,685 A * 11/1986 Lueckenotte et al. .............. 95/3
5,650,728 A * 7/1997 Rhein et al. .................... 324/543
5,734,586 A 3/1998 Chiang et al.

(Continued)

OTHER PUBLICATIONS

Aoki et al., "An Efficient Algorithm for Load Balancing of Transformers and Feeders by Switch Operation in Large Scale Distribution Systems", IEEE, 1988, pp. 1865-1872.*

(Continued)

*Primary Examiner* — Sean Shechtman
*Assistant Examiner* — Thomas Stevens
(74) *Attorney, Agent, or Firm* — Buchanan Ingersoll & Rooney PC

(57) ABSTRACT

A system and method for real-time feeder reconfiguration are disclosed for load balancing in distribution system automation. The load balancing of transformers and feeders can be achieved by load transfer from an overloaded transformer or feeder to an adjacent transformer or feeder which is lightly loaded. An exemplary method can include defining an objective function as a sum of squares of the load deviation of transformers/feeders. The minimization of this objective function determines the optimal operating states (open or closed) of sectionalizing switches. The load balancing operation of transformer and feeder can be carried out by a single operation in which a plurality of switches is reconfigured.

9 Claims, 5 Drawing Sheets

(56) References Cited

U.S. PATENT DOCUMENTS

| | | | |
|---|---|---|---|
| 5,883,796 A * | 3/1999 | Cheng et al. | 363/40 |
| 6,181,984 B1 * | 1/2001 | Sawa et al. | 700/286 |
| 6,654,216 B2 | 11/2003 | Horvath et al. | |
| 7,873,441 B2 * | 1/2011 | Synesiou et al. | 700/286 |
| 2007/0081281 A1 * | 4/2007 | Hamer | 361/42 |
| 2011/0175750 A1 * | 7/2011 | Anderson et al. | 340/870.16 |

OTHER PUBLICATIONS

Roytelman et al., "Multi-Objective Feeder Reconfiguration by Distribution Management System", IEEE, 1995, pp. 517-522.*

* cited by examiner

SYSTEM AND METHOD FOR REAL-TIME FEEDER RECONFIGURATION FOR LOAD BALANCING IN DISTRIBUTION SYSTEM AUTOMATION

RELATED APPLICATION

This application claims priority as a continuation application under 35 U.S.C. §120 to PCT/IB2009/007845, which was filed as an International Application on Dec. 22, 2009 designating the U.S., and which claims priority to Indian Application 529/CHE/2009 filed in India on Mar. 9, 2009. The entire contents of these applications are hereby incorporated by reference in their entireties.

FIELD

A feeder reconfiguration in utility distribution systems is disclosed, such as a real time feeder reconfiguration system for load balancing in distributed system automation.

BACKGROUND INFORMATION

A feeder reconfiguration in utility distribution systems has been an important aspect of distribution automation. The reconfiguration is used to avoid overloading of transformers and feeders resulting from load variations. In a distribution feeder, the load may vary with time and overshoot its rated thermal capacity during some heavy load period. The load variation also depends on the kind of load such as residential load, commercial or industrial load. In case of an overload, in order to keep the system reliable, a part of the load from the overloaded feeder should be transferred to an adjacent feeder that is relatively lightly loaded. Similarly main transformer overloading can be addressed by identifying the appropriate feeder causing the overload and transferring a part of load from that feeder load to an adjacent transformer which is lightly loaded. This redistribution of load among feeders and transformers makes the system more balanced and the risk of overloading is reduced thereby increasing the reliability of a system.

U.S. Pat. No. 6,654,216 provides a distributed monitoring and protection system for a distributed power network. The power network has a plurality of lines for transmitting electric power from a station with circuit breakers included in the lines. The distributed monitoring and protection system includes at least one monitoring unit coupled to at least one of the plurality of power lines for measuring electrical parameters of the power line; and at least one control unit communicating over a data network with the monitoring unit and receiving measured electrical parameters from the monitoring unit.

The protection system described monitors electrical parameters (e.g., current, voltage) in the system to their threshold values and causes tripping of circuit breakers when any electrical parameter overshoots its threshold value. The method described does not involve normalization of load over a variety of equipment by minimization of an objective function.

U.S. Pat. No. 5,734,586 pertains to large-scale, unbalanced, power-distribution networks for achieving steady state by the use of a loss formula, a voltage formula and a line-flow formula therefor. Also disclosed is an explicit formula for determining the variations in system losses, three-phase line flows and voltages, in terms of system and network data, with respect to variations in control devices, network components and connections. Applications of the explicit expression to real-time control of distribution systems are identified. The three-phase power flow and loss formulae are capable of coping with a great number of nodes, branches and laterals; multiphase, grounded or ungrounded loads; co-generators, multiphase shunt elements and transformers of any connections in general, large-scale, unbalanced distribution systems.

The system described does not involve normalization of load over a variety of equipment. Also, it is relatively complex, involving network flow programming techniques and an estimation of the effect of control steps before the actual implementation of control steps.

There are numerous publications dealing with reconfiguration but, except for a few publications, none of them explain on-line reconfiguration. The few publications had algorithms described in a complex way. Heuristic techniques have been proposed to attempt a near optimal solution in a short period. Other techniques include an approach in which the optimal configuration was achieved by opening the branches with lowest current in the optimal load flow solutions for the configuration with all switches closed. There are publications that propose a reconfiguration of the phase balancing using a fuzzy logic and a combinatorial optimization-based implementation step back to back. An input to the fuzzy step is the total load per phase of the feeders. An output of the fuzzy step is the load change values, with a negative value for load releasing and a positive value for load receiving. The output of the fuzzy step is the input to the load changing system. The load changing system uses combinatorial optimization techniques to translate the change values (kW) into a number of load points, and then selects specific load points. It also performs an inter-changing of the load points between the releasing and the receiving phases in an optimal fashion.

Index values used in Kashmen M. A., "Three-phase load balancing in distribution systems using index measurement technique", International Journal of Electrical Power & Energy systems, January 2002, are the branch load balancing indices, and the disclosed system is not directed to control from a system perspective.

In the method described in the publication, network reconfiguration for load balancing is implemented by performing a search over different radial configurations created by considering branch-exchange type switches.

It would be desirable to have a system approach wherein a loading condition of the branches and the overall system, using indices suitable for the branches and an index value of the system, help achieve optimum load balancing. Such systems would be desirable to improve known systems and methods for management of an electrical power distribution system.

SUMMARY

A method is disclosed for real-time feeder reconfiguration for load balancing of transformers and feeders by load transfer from an overloaded transformer or feeder to an adjacent transformer or feeder, the method comprising:
  a. obtaining a System Load Index (SLI) of a distribution system and load indices of any transformers and feeders;
  b. optimizing an objective function formulated as a function of the SLI and load indices; and
  c. obtaining load balance by transferring load to align the load indices of a transformer and/or feeder with the SLI.

A distribution management system is disclosed for performing load balancing of transformers and feeders based on a System Load Index (SLI) and load indices values of transformers and feeders in a distribution network, the system comprising:

a. a control system for determining a System Load Index (SLI) of a distribution system and load indices of transformers and feeders in a distribution network, and for optimizing an objective function formulated as a function of the SLI and load indices; and b. an output for identifying a transferring of load to align the load indices of transformer and feeder with the SLI to achieve load balance.

BRIEF DESCRIPTION OF THE DRAWINGS

The exemplary embodiments are described in detail in this section with the help of figures. It is to be noted, however, that the appended drawings illustrate only exemplary embodiments and are not to be considered limiting of its scope, as other equally effective embodiments will be readily apparent to those skilled in the art. In the drawings.

DESCRIPTION OF THE PREFERRED EMBODIMENTS

Figure 1:
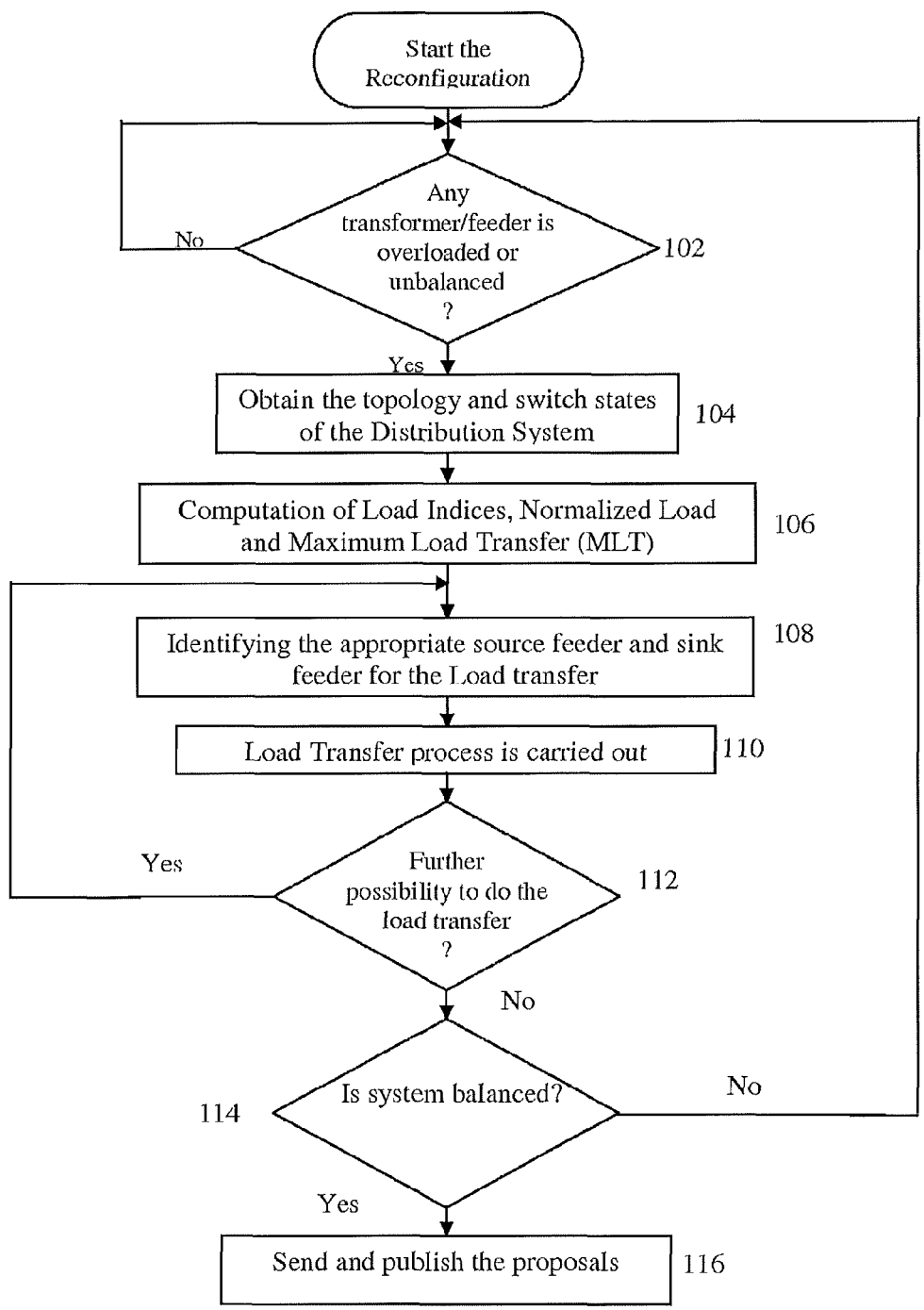
FIG. 1 shows a diagrammatic representation of an exemplary method as disclosed herein.

Systems and methods are disclosed for load balancing in distribution system automation using a real-time feeder reconfiguration.

Systems and methods are disclosed for load balancing in distribution system automation to normalize the load over all the nodes of the system.

An algorithmic approach is also disclosed that enables a distribution system operator to take a quick and feasible decision to operate equipment in balanced condition.

In an exemplary embodiment, a system and method are disclosed for load balancing of transformers and feeders by load transfer from an overloaded transformer or feeder to an adjacent transformer or feeder which is lightly loaded. A uniform load over all equipment can be achieved, and can avoid overloading of any of the equipment. For this purpose, an objective function is defined as a sum of squares of a load deviation of transformers/feeders. A minimization of this objective function can determine an optimal operating state (open or closed) of sectionalizing switches which are simple isolating devices capable of load break and load pick up. Thus, by efficiently changing the open positions of switches subject to the constraints of transformer- and feeder-capacities, any overload condition can be avoided and uniform distribution of load can be achieved.

An exemplary feature disclosed herein is that the load balancing operations of the transformer and feeder can be carried out simultaneously. The operators can operate the switches in real-time with the help of the proposed method for changing loads to derive a certain network configuration. An advantage of this operating practice is to increase the life expectancy of the equipment, transformers, feeders and switches. Balanced three-phase loading condition in the system is assumed, and, for example, unbalancing in three phases is not taken into consideration.

In an exemplary embodiment, a method for real-time feeder reconfiguration for load balancing of transformers and feeders by means (e.g., a computational unit such as a computer or processor programmed to implement a method as disclosed herein) for performing load transfer from an overloaded transformer or feeder, to an adjacent transformer or feeder comprises:

a. obtaining a System Load Index (SLI) of the distribution system and load indices of transformers and feeders;

b. optimizing an objective function formulated as a function of SLI and load indices; and c. obtaining the load balance by transferring load optimally to align the load indices of transformer and feeder with the SLI.

In other exemplary embodiments, methods are disclosed for real-time feeder reconfiguration for load balancing of transformers and feeders by means programmed to perform load transfer from an overloaded transformer or feeder to an adjacent transformer or feeder, wherein optimization comprises:

a. defining an objective function as a sum of squares of the load deviation of transformers/feeders;

b. minimizing the objective function to determine the optimal operating states such as open or closed states of isolating devices capable of load break and load pick up; and c. changing the open positions of isolating devices subject to the constraints of transformer and feeder capacities to avoid overload condition for uniform and balanced distribution of load.

In other exemplary embodiments, the transferring of load comprises:

(a) determining a source feeder and a sink feeder for load transfer;

(b) tracing the path between said source feeder and said sink feeder;

(c) cutting the path into two parts by an open switch;

(d) selecting the neighboring section of said open switch for load transfer; and (e) carrying out said transfer process successively in next section to achieve balanced system.

In other exemplary embodiments, a method is disclosed for real-time feeder reconfiguration for load balancing of transformers and feeders by load transfer from an overloaded transformer or feeder to an adjacent transformer or feeder, wherein the determination of the source feeder is based on:

(a) choosing the feeder with largest load deviation as source feeder if the equipment with greatest load deviation is a feeder, or (b) if the equipment with greatest load deviation is a transformer with negative load deviation, choosing the feeder with smallest load deviation amongst all feeders of said transformer as source feeder; or (c) if the equipment with greatest load deviation is a transformer with positive load deviation, choosing the feeder with largest load deviation amongst all feeders of said transformer as source feeder.

In other exemplary embodiments, a method is disclosed for real-time feeder reconfiguration for load balancing of transformers and feeders by load transfer from an overloaded transformer or feeder to an adjacent transformer or feeder, wherein the determination of a sink feeder comprises:

a. calculation of maximum load transfer for all feeders connected to said source feeder; and b. choosing the feeder with largest value of Maximum Load Transfer as sink feeder, wherein, maximum load transfer is the difference between the actual overload and the capacity.

In another exemplary embodiment, the load balancing operation of a transformer and feeder is carried out by a single operation in which a plurality of switches is reconfigured.

In a further exemplary embodiment there is provided a distribution management system (e.g., containing a properly programmed computer or processor to supplement the programming disclosed herein) for performing load balancing of transformers and feeders based on SLI and load indices values of transformers and feeders in the distribution network in accordance with the method for real-time feeder reconfiguration for load balancing of transformers and feeders by load transfer from an overloaded transformer or feeder to an adjacent transformer or feeder as described herein.

In yet another exemplary embodiment, there is provided a system capable of performing the load balancing of transformers and feeders by a single operation in which a plurality of switches are reconfigured.

A distribution system with every transformer and feeder loaded to the load at a balanced condition is called a system with balanced transformer and feeder loads. In the present disclosure, a load balancing problem is formulated by proposing various load indices of a system as well as the equipment of a distribution system, transformers and feeders. The balance condition of the system can be determined using System Load Index (SLI). The SLI of a distribution system represents the load margin still available to take up at that point of time without violating the capacity constraints of the equipment.

$$\text{System Loading Index } (SLI) = \frac{\text{Actual load}}{\text{Total capacity}} = \frac{\text{Load}_{System}}{\text{Margin}_{System}}$$

$\text{Load}_{System}$=Total load in the power distribution system
$\text{Margin}_{System}$=Total capacity in the power distribution system $$\text{Load}_{System} = \sum_{i}^{nf} L_{Fi}$$

$$\text{Margin}_{System} = \sum_{j}^{nt} M_{Tj} = \sum_{i}^{nf} M_{Fi}$$

$L_{Tj}$=load indices of the transformer j, (j=1, nT)=Actual load in Transformer $T_j$
$L_{Fi}$=load indices of the feeder i, (i=1, nf)=Actual load in feeder $F_i$
$M_{Tj}$=Capacity of Transformer $T_j$
$M_{Fi}$=Capacity of Feeder $F_i$
Similarly the Margin ($M_{TS}$, $M_{Fi}$) of the equipment (transformer and feeder) is defined as:

$$M_{Tj} = \min\left(S_{Tj}, \sum_{i}^{nf} S_{Fi}\right)$$

When feeder $F_i$ is supplied power from transformer $T_j$.

$$M_{Fi} = M_{Tj} \times \frac{S_{Fi}}{\sum_{i}^{nf} S_{Fi}}$$

When feeder $F_i$ is supplied power from transformer $T_j$
$S_{Tj}$=Rated Capacity of transformer $T_j$
$S_{Fi}$=Rated Capacity of Feeder $F_i$ A basic philosophy used for system balancing is to avoid the overloading of any equipment (Transformer, Feeder) based on the load indices so that each equipment is loaded uniformly.

$$\text{Load indices of the transformer} = \frac{L_{Tj}}{M_{Tj}}$$
$$= \frac{\text{Actual Load in Transformer } T_j}{\text{Capacity of Transformer } T_j}$$

$$\text{Load indices of the Feeder} = \frac{L_{Fi}}{M_{Fi}}$$
$$= \frac{\text{Actual Load in Feeder } F_i}{\text{Capacity of Feeder } F_i}$$

Balance condition is when any part/equipment in the system is loaded to the same extent as the consolidated/average load in the system. As described above, the balance condition of the system can be determined or indexed using SLI and for feeder/equipment through load indices. In balanced conditions the load indices and the SLI will be nearly of the same value.

As the system is likely to have different sections of unequal or different capacities, it is desirable to normalize the loading condition for every section to effectively approach balanced system condition.

$$\text{Normalized load} = \frac{\text{Actual load of feeder or transformer}}{\text{Capacity}}$$

The normalized value of loads of the feeders/transformers is the load indices of the feeders/transformers.

As one can readily see, in balanced condition, the normalized load value will be nearly same as the system load index. In other words, each transformer and feeder in a balanced operating distribution system is loaded to its normalized load which is same as SLI.

Load deviation of transformer/feeder ($\Delta L_{Tj}$, $\Delta L_{Fi}$)=Load at balanced condition=(SLI)×(Margin of transformer or feeder)

It is to be noted that the load deviation value is a normalized value.

The balance is achieved by adjusting the load deviations in the feeder/transformer starting with the equipment having the highest load deviation value.

The distribution system comprises transformers as a source to a single or group of feeders with substation breakers and sectionalizing switches. The sectionalizing switches are simple isolating devices capable of load break and load pick-up. Opening and closing of these sectionalizing switches is controlled by a control system (e.g., a computer or processor programmed to perform the method or methods disclosed herein). It is to be noted that only that case is considered where the feeder configuration does not have any feeder loops and all feeder sections are radially energized.

To make the transformer/feeder be in balanced state, load deviation can be minimized. For the system, therefore, the objective for balance is to have load deviations in all the sections (feeders, transformer and branches) minimized. The objective function for optimization is defined as:

$$l = \sum_{j}^{nt} \Delta L_{Tj}^2 + \sum_{i}^{nf} \Delta L_{Fi}^2$$

The load deviation term is squared to make the expression invariant to polarity. The load balance is then obtained using a min-max optimization of the objective function. An exemplary aim here is to identify appropriate switching operations (open/close) in order to obtain the objective of load balancing of transformers and feeders subject to the constraints of their capacities.

The optimization solution identifies an appropriate set of switches that should be closed or opened such that loads on heavily loaded transformers/feeders can be transferred to relatively less heavily loaded transformers/feeders, in order to balance the load on all the transformers/feeders.

During the operation of a distribution system when any transformer or feeder gets overloaded, the overload condition is identified with values of load deviation as an event in the system. The Supervisory Control and Data Acquisition (SCADA) system is configured to sense this event and trigger the Distribution Management System (DMS) application of Load Balancing by Feeder Reconfiguration (LBFR). An exemplary LBFR method is described with the help of FIG. 1.

FIG. 1 shows a diagrammatic representation of exemplary steps involved in the method proposed herein. It starts with the generation of an events described above and proceeds to obtain an appropriate set of switching operations in the following steps:

At step 102 of FIG. 1, the event handler waits till the event has occurred. Once an event is sensed, the DMS application (e.g., a control system and/or software module) is triggered.

At step 104 of FIG. 1, the topology, the switch states (open/close) and feeder section loads are received along with the actual system load of the system as measured values in the system. The capacity limits of transformers and feeders are also obtained from the Distribution Management System database.

At step 106 of FIG. 1, computation of System Loading Index, margin of transformers and feeders ($M_{Tj}$; $M_{Fi}$), normalized load of transformers and feeders is carried out (e.g., in a computer having attendant memory and I/O). In addition, the load deviation of transformers and feeders are also calculated.

At step 108 of FIG. 1, from the load deviation values, the source feeder for load transfer is determined. The source feeder is the one with largest value of load deviation ($\Delta L_{Tj}$ or $\Delta L_{Fi}$). The load transfer on the transformer or feeder with the greatest value of load deviation is given the highest priority. If the equipment (transformer/feeder) with greatest load deviation happens to be a feeder then it is marked as a source feeder from where the load transfer is to take place. Otherwise if the equipment with the greatest load deviation is a transformer (Tj), then based on the load deviation value of that transformer ($\Delta L_{Tj}$), the source feeder is identified. If $\Delta_{Tj} < 0$, the feeder with smallest load deviation ($\Delta L_{Fi}$) among the feeders supplied power from the overloaded transformer is designated as the source feeder for load transfer and if $\Delta LTj > 0$, then the feeder with greatest load deviation ($\Delta L_{Fi}$) is designated as the source feeder for load transfer.

Once a source feeder is identified, the sink feeder is determined from the list of feeders that are connected to the source feeder. Each of these feeders is marked as target feeder. In order to select the appropriate sink feeder among the target feeders, Maximum Load Transfer (MLT) is calculated. The MLT value is at the most equal to the load deviation value. The load ($L_t$) is transferred from feeder ($F_r$) to feeder ($F_s$). The target feeder with largest value of MLT is selected as a sink feeder.

Figure 2:
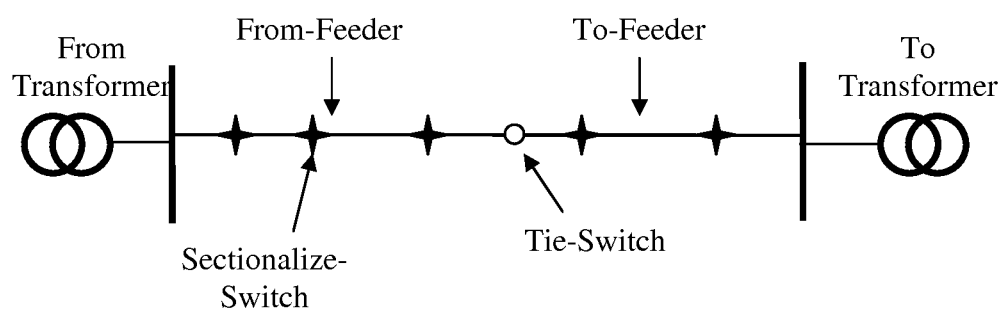
FIG. 2 shows an exemplary load transfer from a source feeder $F_r$ to a sink feeder $F_s$.

FIG. 2 shows an output for identifying a load transfer carried out from source feeder $F_r$ to sink feeder $F_s$ explained below in step 110 of FIG. 1.

At step 110 of FIG. 1, the path between the source feeder and sink feeder is traced. The path is cut into two parts by an open switch, such that one part of the path is supplied power from the source feeder and the other part of the path is supplied power from the sink feeder. The neighboring section of the open switch is selected for load transfer. This transfer process is carried out successively in the next section until no further load transfer is possible or the MLT value is reached. In each succession, the load transfer value depends on the configuration of switches. The load transferred in each succession is termed as incremental load.

At step 112 of FIG. 1, based on the load deviation values calculated, a possibility for any further load transfer is determined in an effort to minimize the objective function. In case of any further possibility, steps 108, 110 and 112 are repeated. Else step 114 is carried out.

At step 114 of FIG. 1, this step is carried out to check for the stabilized loading values in each transformer and feeder after load transfer. In the process of optimization of the objective function, the resulting overloaded condition, if any, in another transformer/feeder due to the load transfer is checked using load flow calculation.

At step 116 of FIG. 1, if no loading violation exists in the system, the result is printed and published to the operator (e.g., via a display or other interface by which an output is provided for identifying the result) with an appropriate switching operation along with the proper sequence.

In order to demonstrate the efficient working of the method proposed, an exemplary case is considered.

Figure 3:
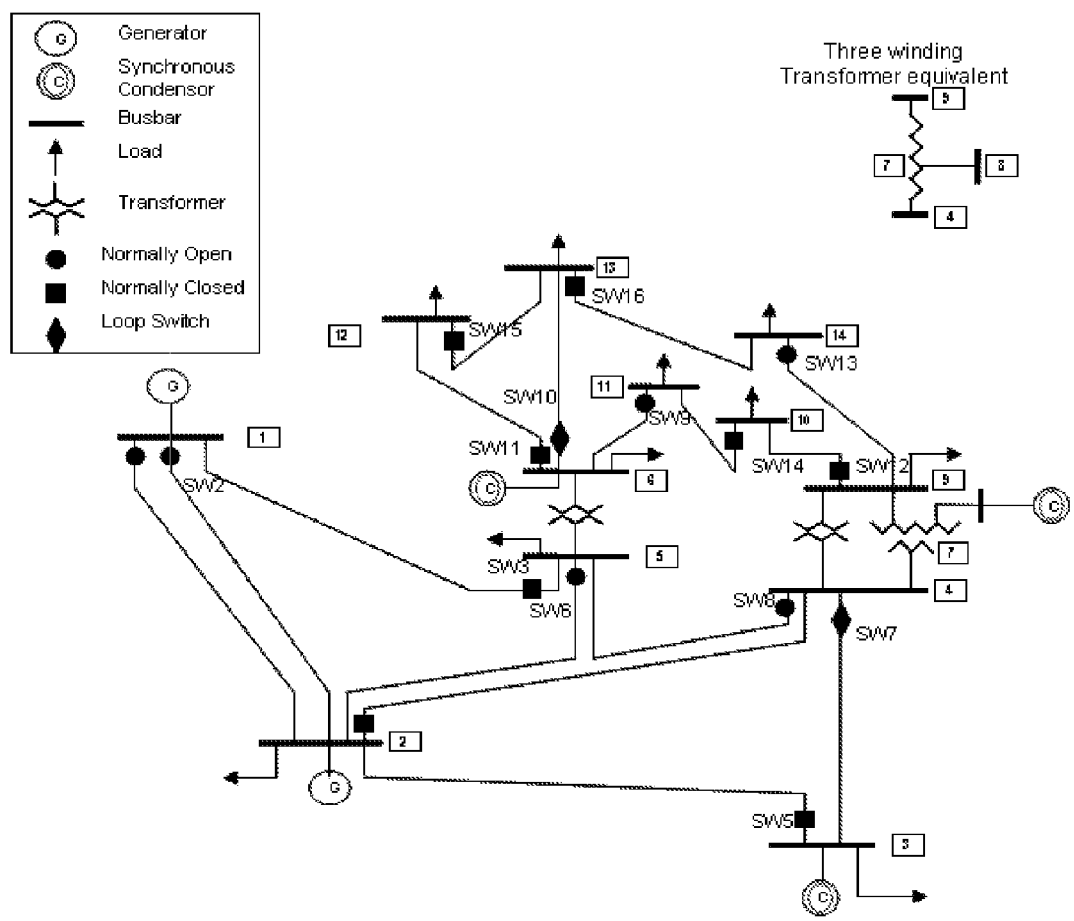
FIG. 3 shows an exemplary 14-Bus test case representing a distribution system according to an exemplary embodiment.

An exemplary embodiment has been explained with reference to a 14-Bus test case with minor modification to represent the same system as a distribution system and this is shown in FIG. 3, including three transformers, nine feeders and seventeen feeder-sections. The system is furnished with sixteen switches by operating a distribution system in radial condition. The base case switch state of the system is shown in FIG. 3, where the filled circle symbols represent the normal open switches and the square filled symbols designate normally closed switches, and the diagonal filled symbols represent the loop switch, (e.g., this switch restricts the system to operate in mesh condition).

Figure 4:
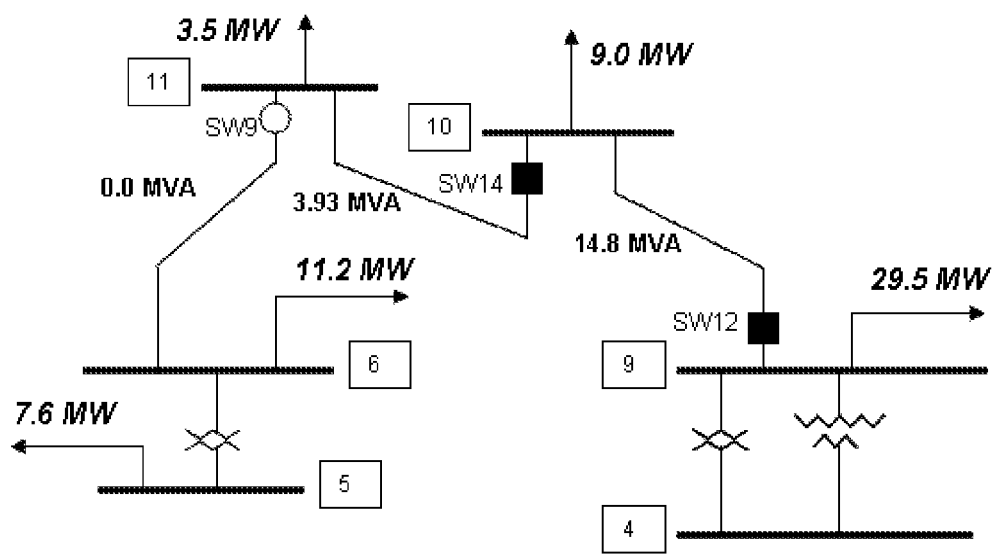
FIG. 4 shows an exemplary case of the distribution system of FIG. 3 before reconfiguration.

The assumption in the beginning is made that the system is operating in radial condition. Square filled symbols represent the normally closed switches. The method is demonstrated by a case in which a feeder is considered which is connected from Bus-9 and spreads over through Bus-10, Bus-11 to Bus-6 as shown in FIG. 4. It is to be noted that with respect to this exemplary case, the SLI is maintained around 0.9.

The feeder section Bus-6 to Bus-11 is switched off (SW9), showing 0.0 MVA power flow. The capacity limit of the feeder section Bus-9 to Bus-10 is set to 12 MVA and for section Bus-6 to Bus-11 is set to 4.5 MVA. During the system operation it is seen that the feeder section Bus-9 to Bus-10 is overloaded with a power flow of 14.8 MVA.

Figure 5:
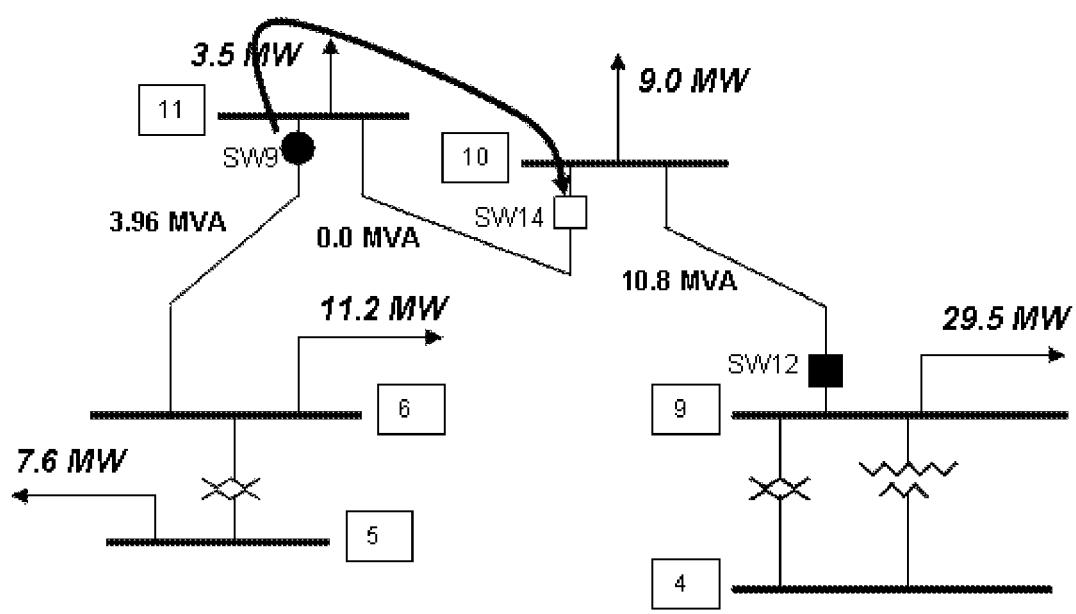
FIG. 5 shows an exemplary case of the distribution system of FIG. 4 after switching.

Using an approach as disclosed herein, the switching states of SW9 and SW14 are exchanged resulting into the load transfer of Bus-11 from the transformer at Bus-9 to the transformer at Bus-6. By this process, the power flow in feeder section Bus-9 to Bus-10 came down to 10.8 MVA to be within the limiting value, as shown in FIG. 5. After switching 'ON' the switch SW9 and switching 'OFF' the switch SW14, the resulting flow of power from Bus-6 to Bus-11 has been increased from 0.0 MVA to 3.96 MVA. Feeder-section Bus-11 to Bus-10 power flow became 0.0 MVA. The flow of power from Bus-9 to Bus-10 has reduced from 14.8 MVA to 10.8 MVA.

From the results presented in FIG. 5, it is observed that the Normalized load value for the source feeder section Bus-9 to Bus-10 is 0.9. Similarly the normalized load value at sink feeder section Bus-6 to Bus-11 is also 0.9. Hence the normalized load value is the same as the SLI maintained for this exemplary case.

Therefore exemplary embodiments are efficient in deriving the desired operations to overcome overload of a feeder.

The approach described enables the distribution system operator to take a quick and feasible decision to operate the equipments in balanced condition. An exemplary feature is that the load balancing operation of transformer and feeder can be carried out simultaneously at one time. The operators can operate the switches in real-time with the help of the disclosed embodiments for changing loads to derive a certain network configuration. An advantage of this operating practice is to increase the life expectancy of the equipments, transformers, feeders and switch.

It is to be noted that the exemplary case described is a very specific case in a distribution system. The method proposed is however applicable to all the possible cases. The mentioned case is therefore not to be considered limiting of the scope of the present invention.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A method for real-time feeder reconfiguration for load balancing of transformers and feeders by load transfer from an overloaded transformer or feeder to an adjacent transformer or feeder, the method comprising:
    a. obtaining a System Load Index (SLI) of a distribution system and load indices of any transformers and feeders;
    b. optimizing an objective function formulated as a function of the SLI and load indices; and
    c. obtaining load balance by transferring load to align the load indices of a transformer and/or feeder with the SLI, wherein the optimizing step includes:
    defining the objective function as a sum of squares of a load deviation of transformers/feeders;
    minimizing the objecting function to determine optimal operating states including any open or closed states of isolating devices for load break and load pick up; and
    changing open positions of isolating devices subject to constraints of transformer and feeder capacities to avoid an overload condition for uniform and balanced distribution of load.

2. The method for real-time feeder reconfiguration for load balancing of transformers and feeders by load transfer from an overloaded transformer or feeder to an adjacent transformer or feeder as claimed in claim 1, wherein said transferring load comprises:
    (a) determining a source feeder and a sink feeder for load transfer;
    (b) tracing a path between said source feeder and said sink feeder;
    (c) cutting the path into two parts by an open switch;
    (d) selecting a neighboring section of said open switch for load transfer; and
    (e) carrying out said transfer successively in a next section to achieve a balanced system.

3. The method for real-time feeder reconfiguration for load balancing of transformers and feeders by load transfer from an overloaded transformer or feeder to an adjacent transformer or feeder as claimed in claim 2, wherein determination of a source feeder is based on:
    (a) choosing a feeder with a largest load deviation as the source feeder when equipment with greatest load deviation is a feeder; or
    (b) when the equipment with greatest load deviation is a transformer with negative load deviation, choosing a feeder with a smallest load deviation amongst all feeders of said transformer as source feeder; or
    (c) when the equipment with a greatest load deviation is a transformer with positive load deviation, choosing a feeder with a largest load deviation amongst all feeders of said transformer as source feeder.

4. The method for real-time feeder reconfiguration for load balancing of transformers and feeders by load transfer from an overloaded transformer or feeder to an adjacent transformer or feeder as claimed in claim 2, wherein said determination of a sink feeder comprises:
    (a) calculation of a maximum load transfer for all feeders connected to said source feeder; and
    (b) choosing a feeder with a largest value of Maximum Load Transfer as the sink feeder;
    wherein, maximum load transfer is a difference between actual overload and capacity.

5. The method for real-time feeder reconfiguration for load balancing of transformers and feeders by load transfer from an overloaded transformer or feeder to an adjacent transformer or feeder as claimed in claim 1, wherein the load deviation is based on loads of transformers and feeders at balanced condition and actual loads of transformers and feeders.

6. The method for real-time feeder reconfiguration for load balancing of transformers and feeders by load transfer from an overloaded transformer or feeder to an adjacent transformer or feeder as claimed in claim 1, wherein said load balancing operation of a transformer and a feeder is carried out by a single operation in which a plurality of switches is reconfigured.

7. The method for real-time feeder reconfiguration for load balancing of transformers and feeders by load transfer from an overloaded transformer or feeder to an adjacent transformer or feeder as claimed in claim 1, wherein a same configuration of said distribution system remains during a calculation process except for open/close states of switches.

8. A distribution management system for performing load balancing of transformers and feeders based on a System Load Index (SLI) and load indices values of transformers and feeders in a distribution network, the system comprising:
    a. a control system for determining a System Load Index (SLI) of a distribution system and load indices of transformers and feeders in a distribution network, and for optimizing an objective function formulated as a function of the SLI and load indices, the control system being configured to optimize the objective function by defining the objective function as a sum of squares of a load deviation of transformers/feeders, minimizing the objecting function to determine optimal operating states including any open or closed states of isolating devices for load break and load pick up, and changing open positions of isolating devices subject to constraints of transformer and feeder capacities to avoid an overload condition for uniform and balanced distribution of load; and b. an output for identifying a transferring of load to align the load indices of transformer and feeder with the SLI to achieve load balance.

9. The distribution management system as claimed in claim 8 in combination with transformers and feeders in a distribution network, wherein the system is configured for performing the load balancing of the transformers and feeders by a single operation in which a plurality of switches is reconfigured.

\* \* \* \* \*